UNITED STATES PATENT OFFICE.

PHILIP KEENAN AND EDWARD O. CONNOR, OF WEST MANCHESTER, PA.

IMPROVEMENT IN PUDDLING-FURNACES.

Specification forming part of Letters Patent No. 50,937, dated November 14, 1865; antedated August 26, 1865; Reissue No. 2,152, dated January 23, 1866.

*To all whom it may concern:*

Be it known that we, PHILIP KEENAN and EDWARD O. CONNOR, of West Manchester, in the county of Allegheny and State of Pennsylvania, have invented a new and useful Improvement in "Fixing" for Puddling or Boiling Furnaces; and we do hereby that the following is a full and exact description thereof.

The nature of our invention consists in the use of iron ore as a fixing for puddling or boiling furnaces when said ore is mixed with fire-clay or other refractory material and used for fixing those portions of the furnace which need protection, said fixing being made into a pasty or adhesive mass and used without previous melting of the fix.

To enable others skilled in the art of puddling or boiling iron to make and use our invention, we will proceed to describe its construction and operation.

We take any good iron ore and pulverize it into a powdery condition, and then mix a small quantity of fire-clay or other refractory material with the powdered iron ore, taking care to mix the ore and clay together in a thorough manner, after which we add to this mixed mass of ore and clay a sufficient quantity of water or other suitable liquid to make the whole into a pasty or adhesive mass, which is applied to those portions of the furnace which require protection by means of the ordinary tools used in fixing puddling or boiling furnaces, said application of the "fix" being used and applied without previous melting of the fix. After the furnace is prepared with this cold or unmelted fix, it is charged with iron, which is melted and worked in the usual manner, which process is well understood by the skillful puddler or boiler.

The advantages of our improvement in fix are as follows: We save time in fixing the furnace, save the fuel required in melting the fix, and avoid the use of scrap-iron in fixing, all of which greatly facilitate the process of puddling or boiling iron.

What we claim is—

The use of iron ore as a fixing for puddling or boiling furnaces when mixed with fire-clay or other refractory material and used for fixing those portions of the furnace which need protection, without previous melting of the fix.

PHILIP KEENAN.
EDWARD O. CONNOR.

Witnesses:
JAMES J. JOHNSTON,
JOHN DENTON.